United States Patent
Chen

(10) Patent No.: US 8,509,520 B2
(45) Date of Patent: Aug. 13, 2013

(54) SYSTEM AND METHOD FOR ESTABLISHING ASSOCIATION FOR A PLURALITY OF IMAGES AND RECORDING MEDIUM THEREOF

(75) Inventor: Ke-Ting Chen, Kaohsiung (TW)

(73) Assignee: Institute for Information Industry, Taipei (TW)

(*) Notice: Subject to any disclaimer, the term of this patent is extended or adjusted under 35 U.S.C. 154(b) by 602 days.

(21) Appl. No.: 12/634,215

(22) Filed: Dec. 9, 2009

(65) Prior Publication Data

US 2011/0116718 A1 May 19, 2011

(30) Foreign Application Priority Data

Nov. 17, 2009 (TW) ................................ 98139045 A

(51) Int. Cl.
*G06K 9/00* (2006.01)
*G06K 9/32* (2006.01)

(52) U.S. Cl.
USPC .......................................... 382/154; 382/294

(58) Field of Classification Search
USPC ................. 382/154, 115, 118, 180–181, 201, 382/216, 282, 284, 287–289; 345/419–427
See application file for complete search history.

(56) References Cited

U.S. PATENT DOCUMENTS

| | | | | |
|---|---|---|---|---|
| 6,668,082 | B1* | 12/2003 | Davison et al. | 382/190 |
| 7,187,809 | B2* | 3/2007 | Zhao et al. | 382/285 |
| 7,412,427 | B2* | 8/2008 | Zitnick et al. | 706/20 |
| 8,131,113 | B1* | 3/2012 | Jin | 382/284 |
| 2007/0179921 | A1* | 8/2007 | Zitnick et al. | 706/20 |
| 2008/0310757 | A1* | 12/2008 | Wolberg et al. | 382/285 |
| 2010/0014781 | A1* | 1/2010 | Liu et al. | 382/285 |
| 2010/0021065 | A1* | 1/2010 | Sibiryakov | 382/190 |
| 2010/0322522 | A1* | 12/2010 | Wang et al. | 382/218 |
| 2011/0090337 | A1* | 4/2011 | Klomp et al. | 348/144 |

OTHER PUBLICATIONS

Brown et al, Automatic Panoramic Image Stitching using Invariant Features, International Journal of Computer Vision 74(1), 59-73, 2007.*
Brown, M. and Lowe, D. 2003. Recognising panoramas. In Proceedings of the 9th International Conference on Computer Vision (ICCV03). Nice, vol. 2, pp. 1218-1225.*
Brown, M.; Lowe, D.G.;, "Unsupervised 3D object recognition and reconstruction in unordered datasets," 3-D Digital Imaging and Modeling, 2005. 3DIM 2005. Fifth International Conference on , vol., No., pp. 56-63, Jun. 13-16, 2005.*

* cited by examiner

*Primary Examiner* — Andrae S Allison
(74) *Attorney, Agent, or Firm* — Muncy, Geissler, Olds & Lowe, PLLC

(57) ABSTRACT

A system and a method for establishing an association for a plurality of images and a recording medium thereof are provided. The system includes a storage module and an association establishment module. The storage module stores a plurality of images. Any two images having at least one common content form an associated image set. Each associated image set has an associated position information and an associated angle information, and each image in the same associated image set respectively has a photographing point with respect to a common content therein. The associated position information and the associated angle information are relative positions of and an included angle between photographing angles of the two photographing points with respect to the common content. The association establishment module establishes an association between the images according to the associated image sets and the associated position information and the associated angle information thereof.

17 Claims, 17 Drawing Sheets

SYSTEM AND METHOD FOR ESTABLISHING ASSOCIATION FOR A PLURALITY OF IMAGES AND RECORDING MEDIUM THEREOF

CROSS-REFERENCE TO RELATED APPLICATION

This application claims the benefit of Taiwan Patent Application No. 098139045, filed on Nov. 17, 2009, which is hereby incorporated by reference for all purposes as if fully set forth herein.

BACKGROUND OF THE INVENTION

1. Field of Invention

The present invention relates to the field of a technology for establishing an association for a plurality of images, and more particularly to the field of a technology for establishing an association for a plurality of images by establishing an associated image set for any two images having a common content and obtaining an associated position information and an associated angle information thereof according to contents of the images.

2. Related Art

In the prior art, only several methods for establishing an association between images exist. In a first method, feature points of all the images, for example, overlapping portions of image contents, are analyzed, and the captured images are combined to form a panoramic image. In a second method, special hardware such as a camera, an infrared camera, or a laser range finder is used to extract environmental information continuously, so as to acquire environmental images at different angles, which are used for establishing a three-dimensional image map. In a third method, feature points and photographing angles of all the images are analyzed, and a three-dimensional image map is established using a three-dimensional modeling technology (for example, photosynth).

However, among the above technologies, the first technology can only be applied to establish a two-dimensional image map and process a simple spatial relationship, but cannot present the panorama of a single object; the second technology requires continuous photographing in the target environment, and has high device requirements for the special hardware, resulting in poor practicability; although the third technology calculates the image relationship using the feature points of the images, the image space establishment system regards two images having no relevant feature point as unassociated images, even if they contain a relevant image content.

Therefore, how to find an association between a plurality of images so as to assist persons in the industry or users in performing the relevant image processing operation is a problem to be considered.

SUMMARY OF THE INVENTION

Accordingly, the present invention is directed to an association establishment system capable of assisting in establishing an association between images without inputting photographing parameters of the images or when the images do not necessarily have relevant feature points.

In order to solve the above system problem, the present invention provides a system for establishing an association for a plurality of images, which includes a storage module and an association establishment module.

The storage module is used for storing a plurality of images. Any two of all the images containing at least one common content form an associated image set. Each associated image set has an associated position information and an associated angle information. Each image in the same associated image set respectively has a photographing point with respect to a common content therein. The associated position information is relative positions of the two photographing points, and the associated angle information is an included angle between photographing angles of the two photographing points respectively with respect to the common content. The association establishment module establishes an association between the images according to the associated image sets, the associated position information and the associated angle information thereof.

In order to solve the above problem, the present invention provides a method for establishing an association for a plurality of images, which includes: providing a plurality of images, in which any two of all the images containing at least one common content form an associated image set, each associated image set has an associated position information and an associated angle information, each image in the same associated image set respectively has a photographing point with respect to a common content therein, the associated position information is relative positions of the two photographing points, and the associated angle information is an included angle between photographing angles of the two photographing points respectively with respect to the common content; and establishing an association between the images according to the associated image sets, the associated position information and the associated angle information thereof.

The present invention provides a non-transitory computer recording medium, which is readable by an electronic device to perform a method for establishing an association for a plurality of images. The non-transitory computer recording medium includes a first program code and a second program code. The first program code is used for storing a plurality of images. Any two of the images containing at least one common content form an associated image set. The associated image set has an associated position information and an associated angle information. Each image in the associated image set respectively has a photographing point with respect to a common content therein. The associated position information is relative positions of the two photographing points, and the associated angle information is an included angle between photographing angles of the two photographing points respectively with respect to the common content. The second program code is used for establishing an association between the images according to the associated image sets, the associated position information and the associated angle information thereof.

The present invention has the following characteristics. Firstly, the present invention is applicable to the establishment of two-dimensional and three-dimensional image maps, and thus enables a complete presentation of an environment at various angles. Secondly, the technology disclosed in the present invention has low device requirements, so the required device cost is also reduced. Thirdly, the technology disclosed in the present invention reliably establishes the positions of images and an adjacency relationship there-between using camera parameters (i.e., associated position information and associated angle information) corresponding to each image, which helps to assist in the relevant image processing operation.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Preferred embodiments of the present invention are illustrated in detail below with reference to the accompanying drawings.

Figure 1A:
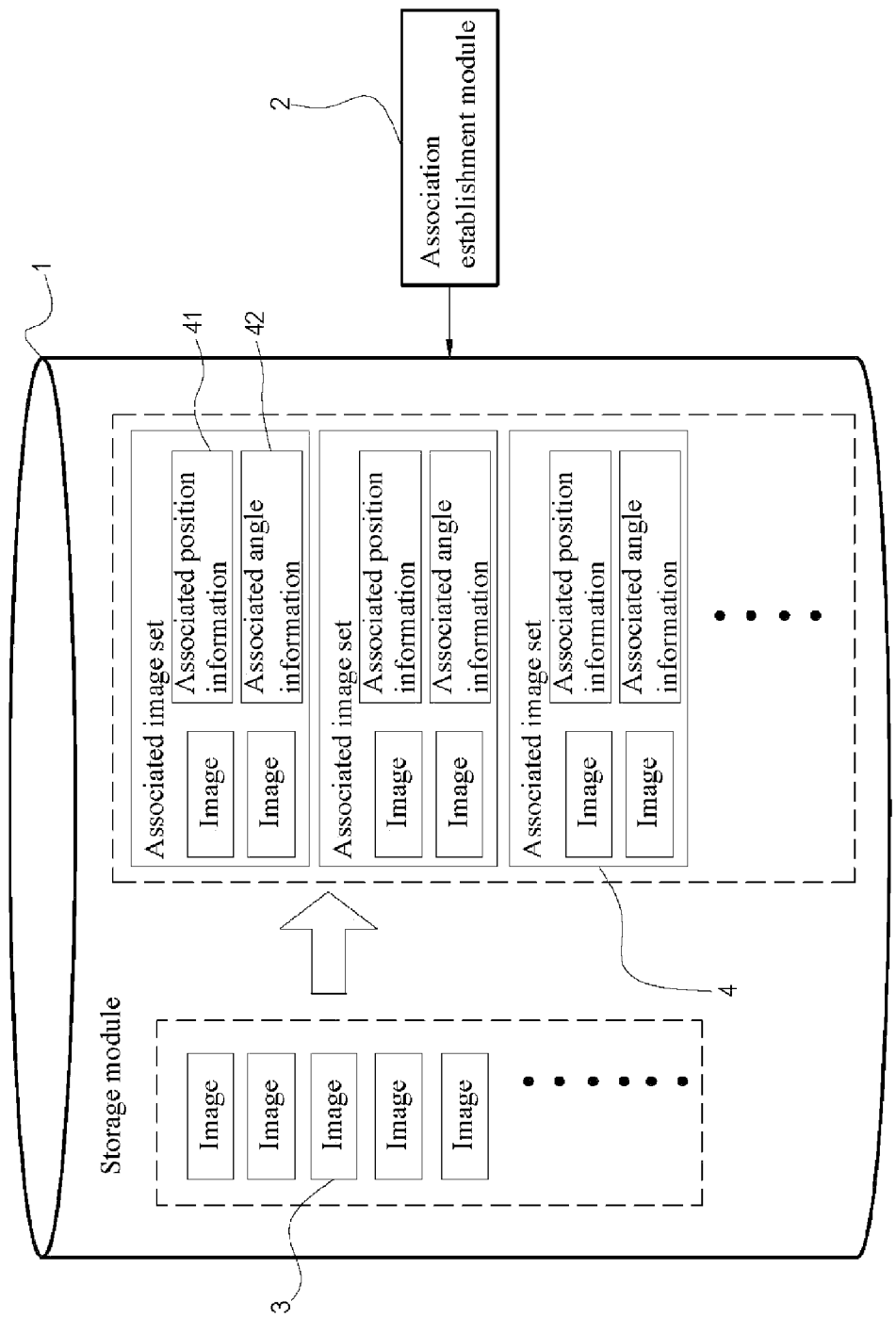
FIG. 1A is a block diagram of a first embodiment of a system for establishing an association for a plurality of images according to the present invention.

FIG. 1A is a block diagram of a first embodiment of a system for establishing an association for a plurality of images according to the present invention. Referring to FIG. 1A, the system includes a storage module 1 and an association establishment module 2. The storage module 1 stores a plurality of images 3. When any two of the images 3 contain at least one common content, the two images form an associated image set 4. Each associated image set 4 has an associated position information 41 and an associated angle information 42.

Figure 1B:
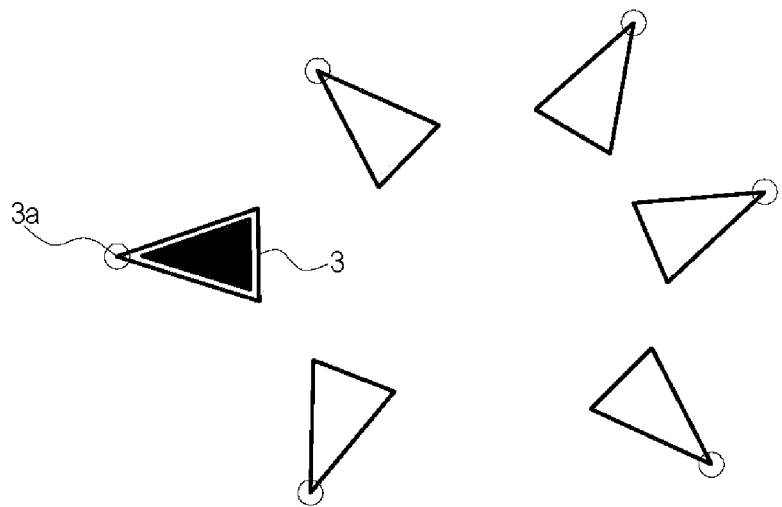
FIG. 1B is a conceptual view of images according to an embodiment of the present invention.

FIG. 1B is a conceptual view of images according to an embodiment of the present invention, which shows a plurality of equilateral triangles, each indicating the relevant meaning of an image. All the images 3 are captured by at least one image capturing module 5 (in FIG. 1D). In each triangle, a round spot at a vertex angle between two equal sides denotes a photographing point 3a corresponding to each image, i.e., a position of the image capturing module 5, the two equal sides represent a photographing range of the image capturing module 5, and the bottom side denotes the image 3 captured by the image capturing module 5.

Figure 1C:
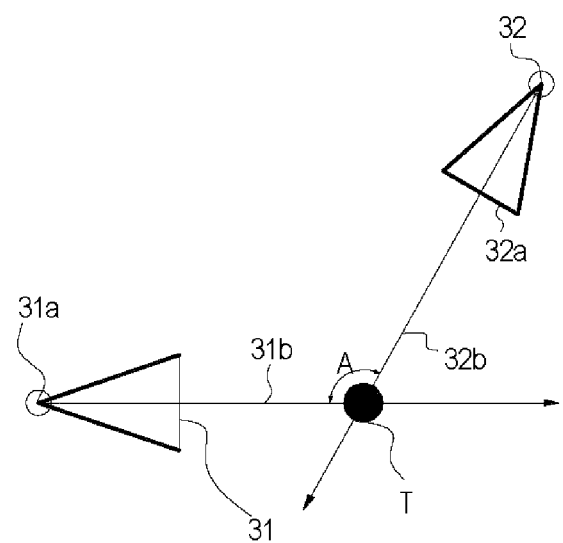
FIG. 1C is a schematic view illustrating a relationship of an associated image set according to an embodiment of the present invention.

FIG. 1C is a schematic view illustrating a relationship between associated images according to an embodiment of the present invention. Two images 3 included in the same associated image set 4 respectively have a photographing point 3a with respect to a common content. The associated position information 41 is relative positions, for example, two-dimensional or three-dimensional relative coordinates of the two photographing points 3a, and the associated angle information 42 is an included angle between photographing angles of the two photographing points 3a respectively with respect to the common content. The photographing point 3a and the photographing angle are a position and an angle of the image capturing module 5 relative to the common content when capturing a corresponding image.

As shown in FIG. 1C, a first image 31 is corresponding to a first photographing point 31a, and a second image 32 is corresponding to a second photographing point 32a. A first photographing angle of the image capturing module 5 when photographing a common content T at the first photographing point 31a and a second photographing angle 32b of the image capturing module 5 when photographing the common content T at the second photographing point 32a intersect to form an included angle A, which is the aforementioned associated angle information. The relative orientations and distance between the first photographing point 31a and the second photographing point 32a are the aforementioned associated position information.

The above-mentioned associated position information 41 and associated angle information 42 are camera parameters. The camera parameters may be obtained by calculating a fundamental matrix using the five-points algorithm and then decomposing the matrix, or obtained by other camera calibration methods, which belongs to the prior art and thus will not be illustrated in detail herein.

The above-mentioned common content T may be an object, a shape, a color block, or a feature point provided for identification that is captured in the same associated image set 4. The feature point may be a point having a specific feature in the image 3. The feature may be edge, corner, significant color change, or the like. Feature points having various different features may be obtained according to different feature point extraction methods. For example, the Moravec corner detection algorithm determines a position of a corner by determining whether neighboring patches are similar, and the scale invariant feature transform (SIFT) finds a position of a potential feature point by calculating extrema of difference of Gaussians (DOG).

Feature point matching means comparing feature points in one image 3 with feature points in other images 3, and determining whether the feature points are corresponding to the same spatial position. The matching may be performed by simply checking whether descriptors of the feature points are similar, or further detecting a correct corresponding relationship by using the random sample consensus (RANSAC) and fundamental matrix.

Figure 1D:
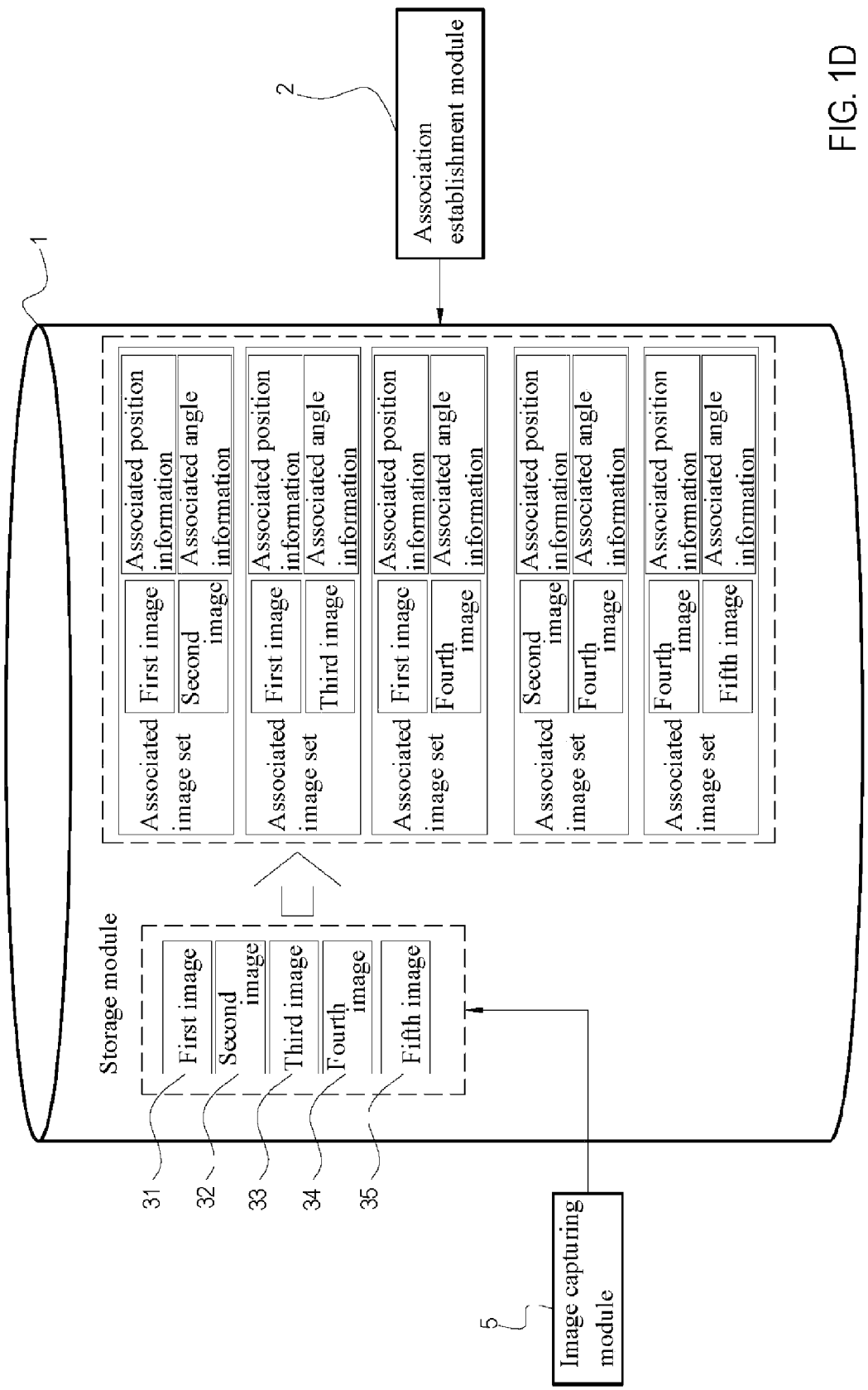
FIG. 1D is a block diagram illustrating a data relationship of associated image sets according to an embodiment of the present invention.

FIG. 1D is a block diagram illustrating a data relationship of associated image sets according to an embodiment of the present invention. For example, the storage module 1 stores five images, namely, a first image 31, a second image 32, a third image 33, a fourth image 34, and a fifth image 35. The first image 31 is associated with the second image 32, the third image 33, and the fifth image 35. The second image 32 is associated with the first image 31 and the fourth image 34. The third image 33 is associated with the first image 31. The fourth image 34 is associated with the second image 32 and the fifth image 35. The fifth image 35 is associated with the first image 31 and the fourth image 34. Five associated image sets are formed, namely, (the first image, the second image), (the first image, the third image), (the first image, the fifth image), (the second image, the fourth image), and (the fourth image, the fifth image). However, the present invention is not limited thereto, and different associated image sets may also be formed when the number of the images is different and the images are associated in different ways. The association establishment module 2 establishes an association between the images 3 according to the associated image sets 4 and the associated position information 41 and the associated angle information 42 of each set. When the association between the images 3 is in the form of a two-dimensional space, photographing angle includes a horizontal angle, and the associated angle information 42 is an included angle between horizontal angles of the two photographing points respectively with respect to the common content. When the association between the images 3 is in the form of a three-dimensional space, the photographing angle includes a horizontal angle and a pitching angle, and the associated angle information 42 is an included angle between horizontal angles of the two photographing points respectively with respect to the common content and an included angle between pitching angles of the two photographing points respectively with respect to the common content; or the photographing angle includes an X-axis angle, a Y-axis angle, and a Z-axis angle, and the associated angle information 42 is an included angle between X-axis angles of the two photographing points respectively with respect to the common content, an included angle between Y-axis angles of the two photographing points respectively with respect to the common content, and an included angle between Z-axis angles of the two photographing points respectively with respect to the common content. The association between the images 3 is an association between the photographing points 3a corresponding to the images and an association between the photographing angles corresponding to the images.

Figure 1E:
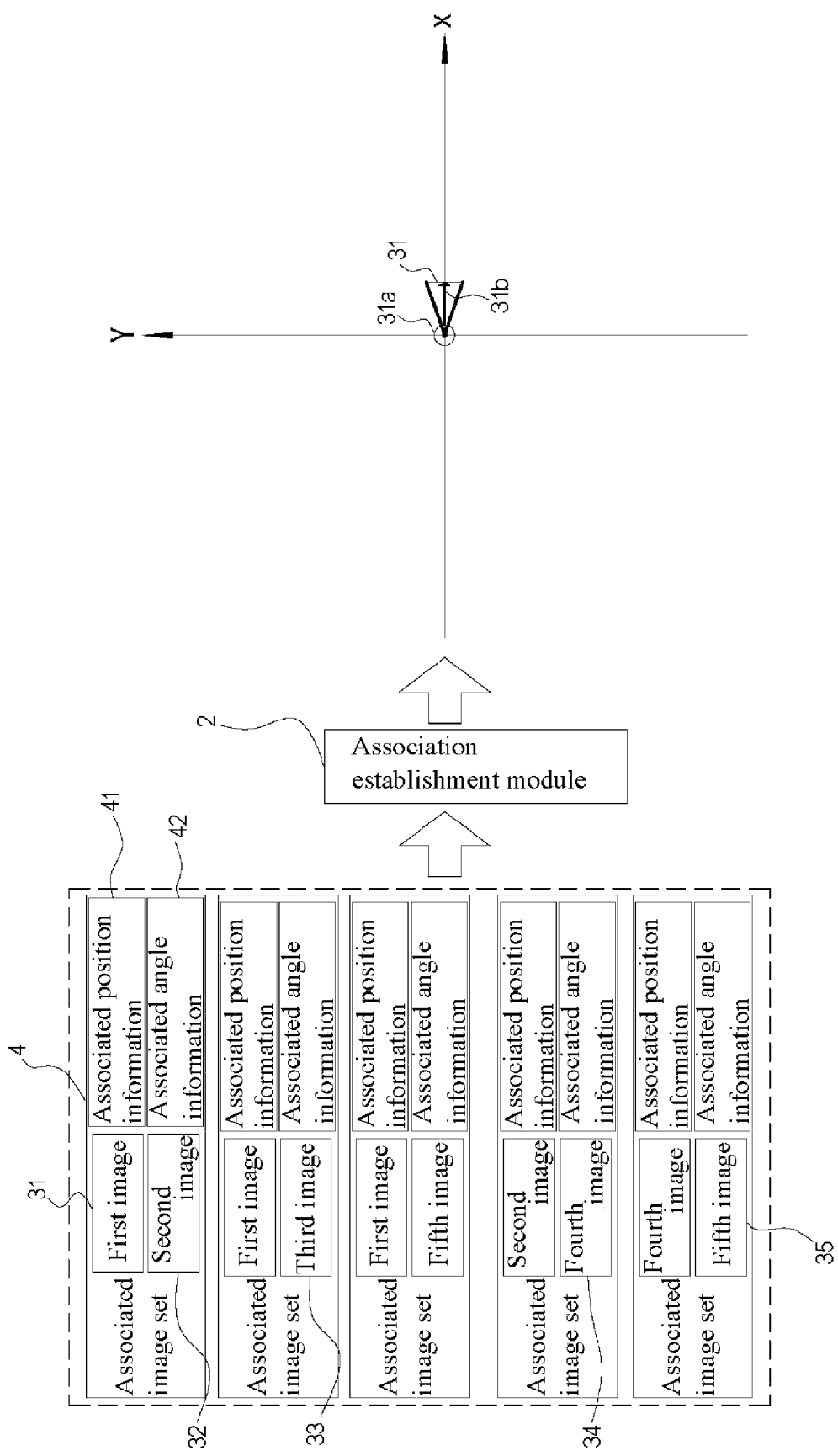
FIGS. 1E to 1G are schematic views illustrating establishment of an image association according to an embodiment of the present invention.
Figure 1F:
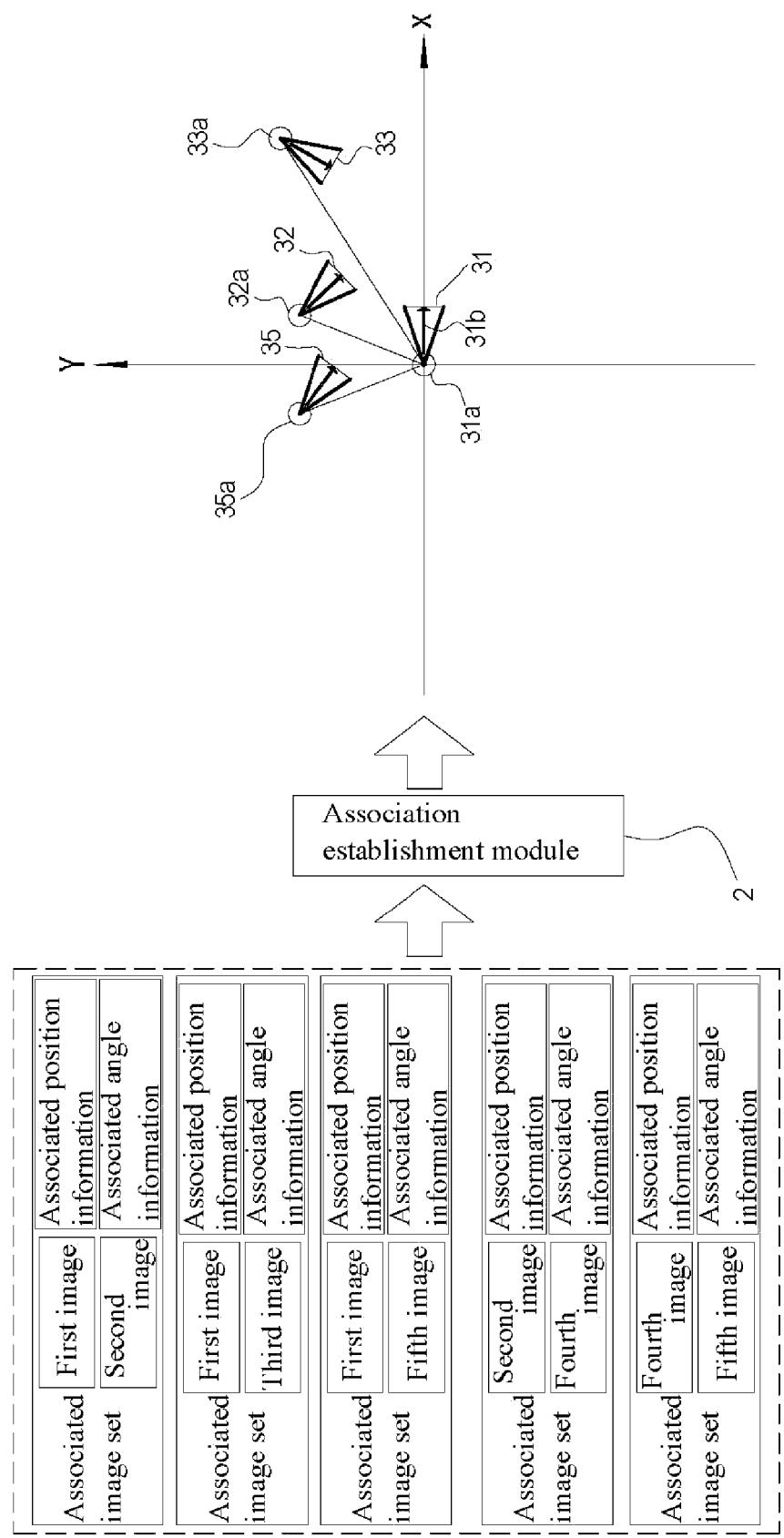
Figure 1G:
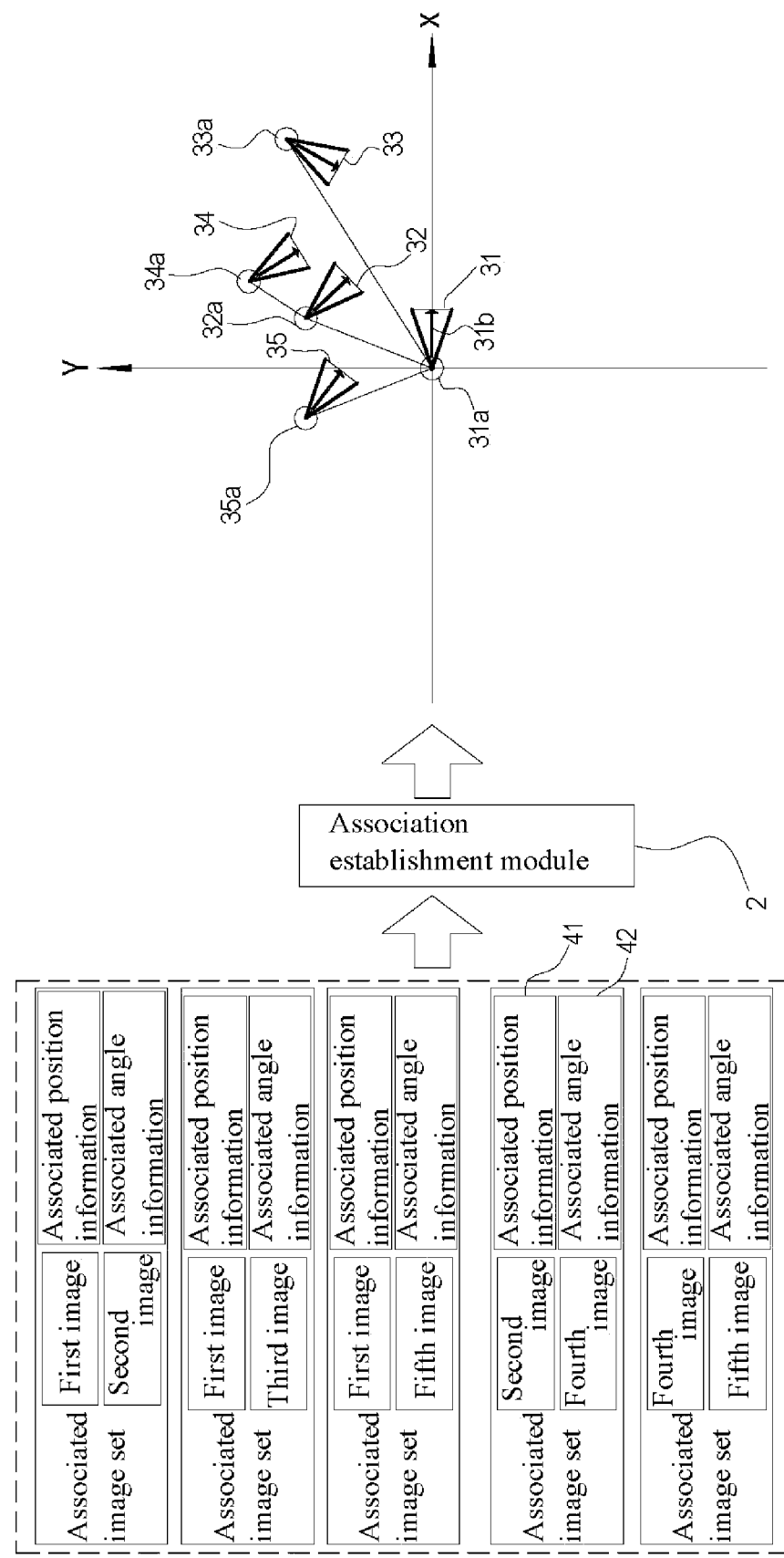

FIGS. 1E to 1G are schematic views illustrating establishment of an image association according to an embodiment of the present invention. Reference is made to FIGS. 1E to 1G as well as FIG. 1D for ease of understanding. The establishment of an image map of a two-dimensional space is illustrated in this embodiment; however, this method is also applicable to a three-dimensional space. When establishing an association between the images 3, the association establishment module 2 first selects one image 3 in an associated image set 4 as a starting image, decides a coordinate and a photographing angle of a photographing point 3a of the starting image in a coordinate system, decides a coordinate and a photographing angle of a photographing point of the other image 3 in the associated image set 4 according to the associated position information 41 and the associated angle information 42 of the associated image set 4, and then regards the images having the coordinates and the photographing angles as an associated image group. During the process, the association establishment module 2 selects an image 3 having a maximum number of associated image sets formed with other images 3 as the starting image, which in this embodiment refers to, but is not limited to, an image 3 having the highest frequency of occurrence in all the associated image sets 4.

As shown in FIGS. 1D and 1E, the first image 31 having a maximum number of associated image sets formed with other images, so the association establishment module 2 selects the first image 31 as the starting image and regards the first photographing point 31a of the first image 31 as an origin of the coordinate system. Photographing angles corresponding to the photographing point at the origin are all zero, i.e., when the coordinate system is a two-dimensional space, a horizontal angle corresponding to the photographing point at the origin is zero; when the coordinate system is a three-dimensional space, a horizontal angle and a pitching angle corresponding to the photographing point at the origin are both zero. In this embodiment, a horizontal angle included in the first photographing angle 31b corresponding to the first photographing point 31a is zero.

As shown in FIGS. 1D and 1F, the association establishment module 2 finds the second image 32, the third image 33, and the fifth image 35 associated with the first image 31, decides coordinates and photographing angles of the second photographing point 32a, a third photographing point 33a, and a fifth photographing point 35a of the second image 32, the third image 33, and the fifth image 35 in the coordinate system, i.e., relative coordinates with respect to the first photographing point 31a (the photographing point of the starting image) and relative angles of photographing angles of the images with respect to the first photographing angle 31b of the first photographing point 31a, according to the associated position information 41 and the associated angle information 42 included in the associated image sets 4, and regards the first image 31, the second image 32, the third image 33, and the fifth image 35 as an associated image group.

The association establishment module 2 then searches for another associated image set to be processed according to the associated image group. One image in the associated image set to be processed is one image in the associated image group. The association establishment module 2 decides a coordinate and a photographing angle of a photographing point of the other image in the associated image set to be processed in the coordinate system according to the photographing point having the coordinate of the image and the associated position information and the associated angle information of the image set to be processed, and then regards the images having the coordinates and the photographing angles as an associated image group.

As shown in FIGS. 1D, 1F, and 1G, the association establishment module 2 searches for images associated with the second image 32, the third image 33, and the fifth image 35. The second image 32 is associated with the fourth image 34, and the fifth image 35 is also associated with the fourth image 34, so the association establishment module 2 selects either the second image 32 or the fifth image 35 to perform the association operation of the fourth image 34.

The associated image set (the second image 32, the fourth image 34) is illustrated in this embodiment. The association establishment module 2 finds the fourth image 34 associated with the second image 32, decides a coordinate and a photographing angle of a fourth photographing point 34a of the fourth image 34 in the coordinate system, i.e., a relative coordinate with respect to the second photographing point 32a and a relative angle of a photographing angle of the fourth image 34 with respect to the photographing angle of the second image 32, according to the associated position information 41 and the associated angle information 42 included in the associated image set (the second image 32, the fourth image 34), and regards the first image 31, the second image 32, the third image 33, the fourth image 34, and the fifth image 35 as an associated image group. Thus, the association between the images is completed, as shown in FIG. 1G. The coordinates and the photographing angles of the photographing points of the finally completed associated image group form an image map. The image map formed in this embodiment is a two-dimensional space; however, this method is also applicable to the establishment of an image map corresponding to a three-dimensional space.

Figure 1H:
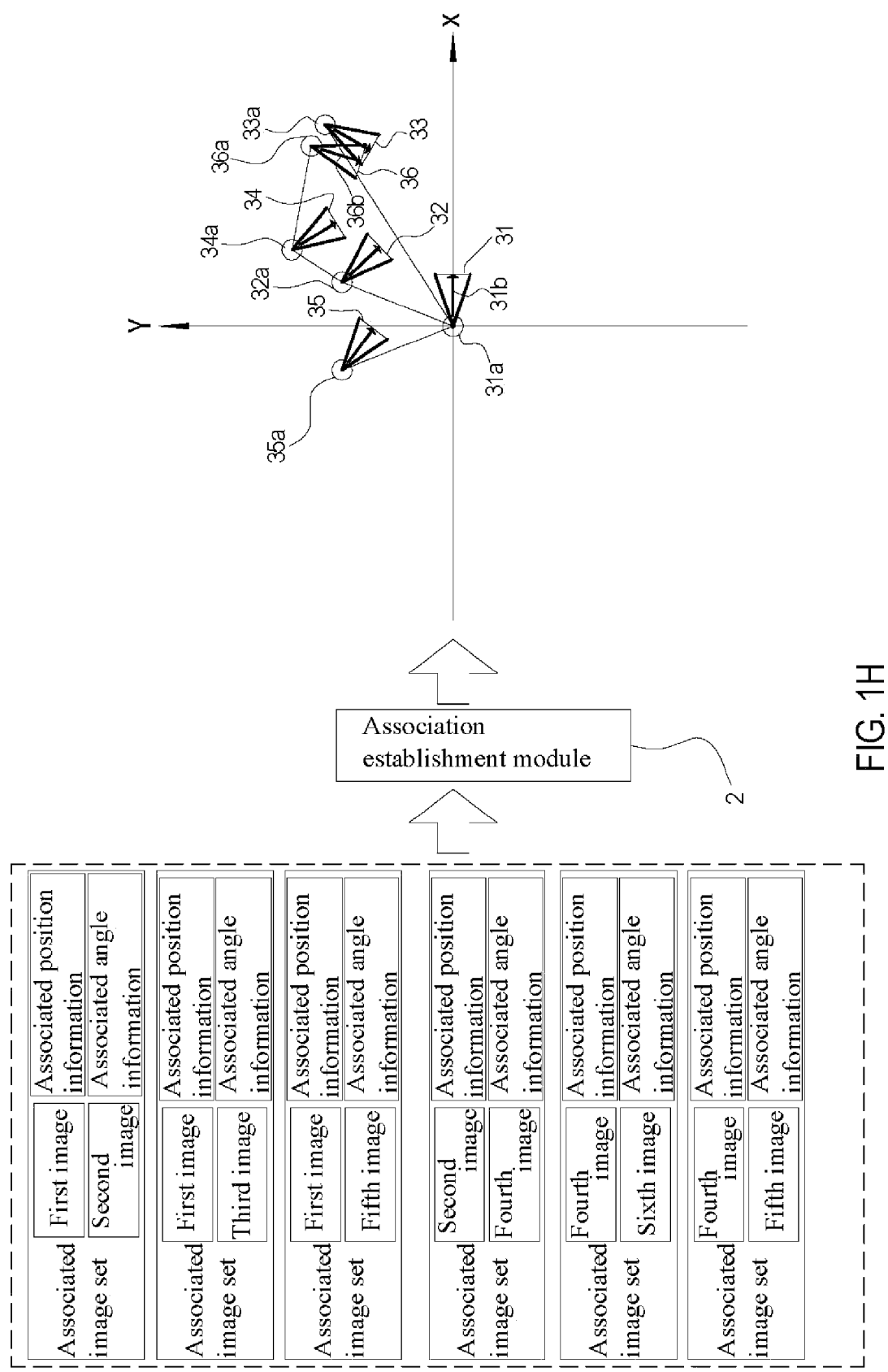
FIGS. 1H and 1I are schematic views illustrating an image similarity comparison operation according to an embodiment of the present invention.
Figure 1I:
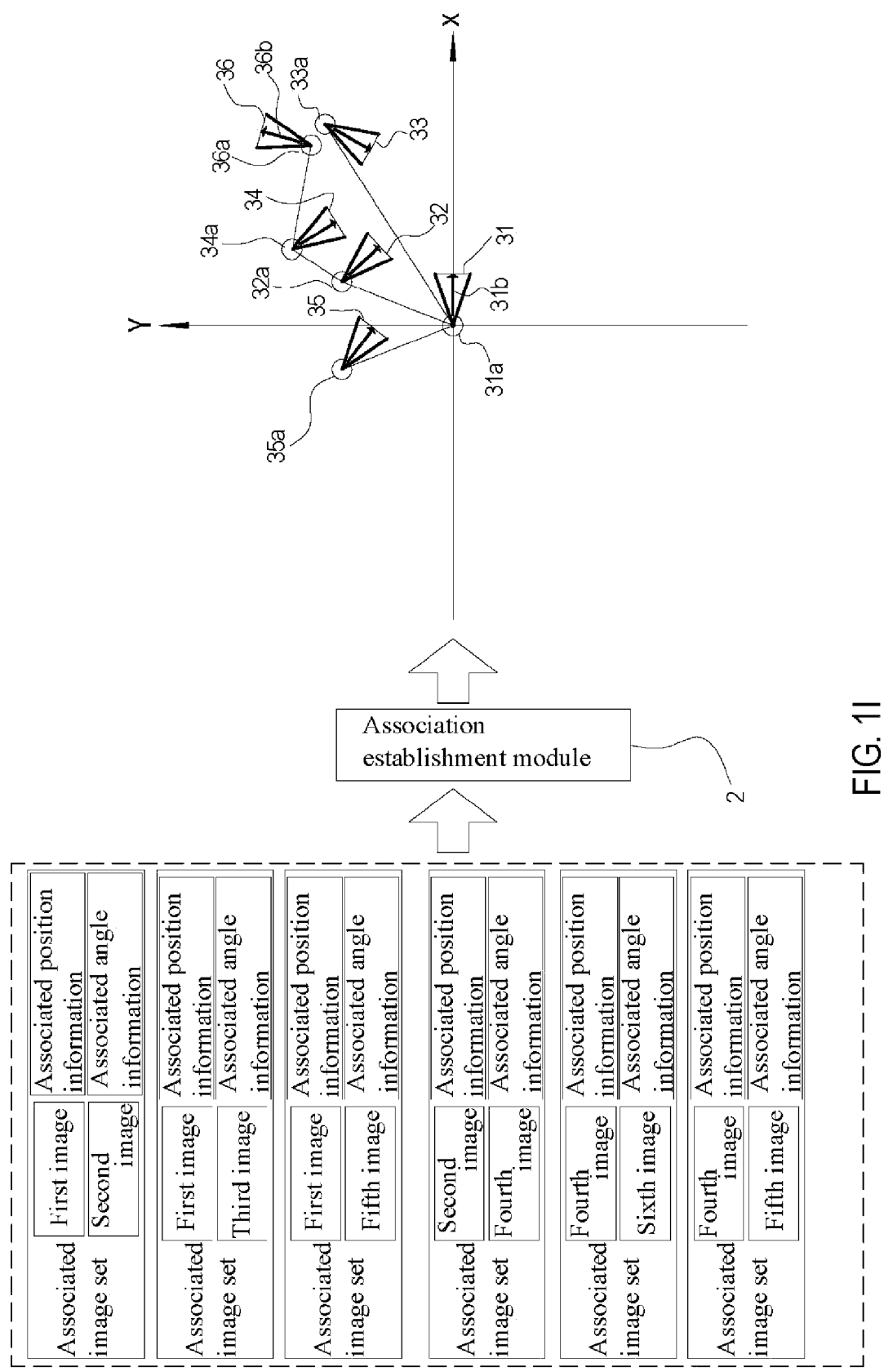

FIGS. 1H and 1I are schematic views illustrating an image similarity comparison operation according to an embodiment of the present invention. When deciding the coordinate of the photographing point of the other image in the associated image set to be processed, the association establishment module 2 determines whether a comparison image having a photographing point with similar coordinate and photographing angle exists in all the associated image group. If the comparison image exists, the association establishment module 2 determines whether the comparison image and the other image in the associated image set to be processed have a common content. If no common content exists, the association establishment module 2 decides not to add the other image in the associated image set to be processed to the associated image group. Further, the association establishment module 2 finds associated image sets to be processed formed by the image determined not to be added to the associated image group and other images, and then re-decides a coordinate and a corresponding photographing angle of the photographing point of the image determined not to be added in the coordinate system according to the associated position information and the associated angle information of any one of the associated image sets to be processed. One example is given below for detailed illustration.

In this embodiment, a sixth image 36 is further provided, which is associated with the fourth image 34. When loading a sixth photographing point 36a and a sixth photographing angle 36b of the sixth image 36 in the coordinate system, the association establishment module 2 determines that the sixth photographing point 36a and the sixth photographing angle 36b are similar to the third photographing point 33a and the third photographing angle 33b of the third image 33, i.e., regards the third image 33 as the aforementioned comparison image. The association establishment module 2 analyzes whether the third image 33 and the sixth image 36 have a common content. If the result of analysis is yes, the association establishment module 2 adds the sixth photographing point 36a and the sixth photographing angle 36b corresponding to the sixth image 36 to the coordinate system, as shown in FIG. 1H.

On the contrary, if the result of analysis is no, the association establishment module 2 does not add the sixth photographing point 36a and the sixth photographing angle 36b corresponding to the sixth image 36 to the coordinate system.

Further, assuming that the sixth image 36 is associated with the fifth image 35, the association establishment module 2 determines that the sixth image 36 and the fifth image 35 form an associated image set, and decides a coordinate and a photographing angle of the sixth image 36 in the coordinate system, i.e., a relative coordinate with respect to the fifth photographing point 35a and a relative angle of the sixth photographing angle 36b of the sixth image 36 with respect to the photographing angle of the fifth photographing point 35a, according to an associated position information 41 and an associated angle information 42 of the associated image set (the sixth image 36, the fifth image 35). As shown in FIG. 1I, the form of loading the sixth photographing point 36a and the sixth photographing angle 36b in the coordinate system is corrected.

Figure 2:
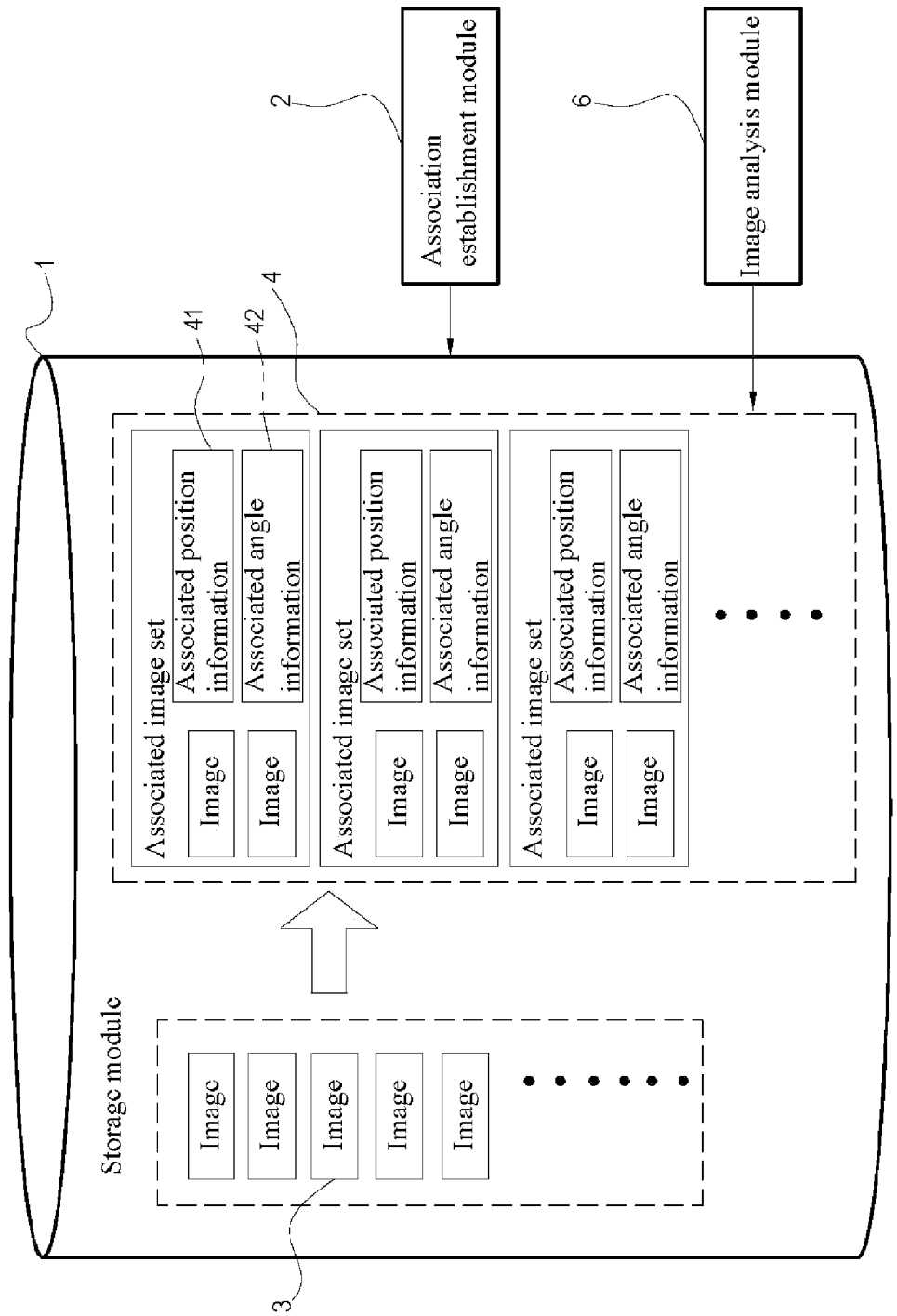
FIG. 2 is a block diagram of a second embodiment of the system for establishing an association for a plurality of images according to the present invention.

FIG. 2 is a block diagram of a second embodiment of the system for establishing an association for a plurality of images according to the present invention. Referring to FIG. 2, the system includes an image analysis module 6. The image analysis module 6 is used for analyzing photographing information and the common content of each associated image set 4 so as to respectively generate corresponding photographing points and photographing angles for two images 3 included in the associated image set 4, according to which the association establishment module 2 generates the associated position information 41 and the associated angle information 42 of the associated image set 4.

Figure 3:
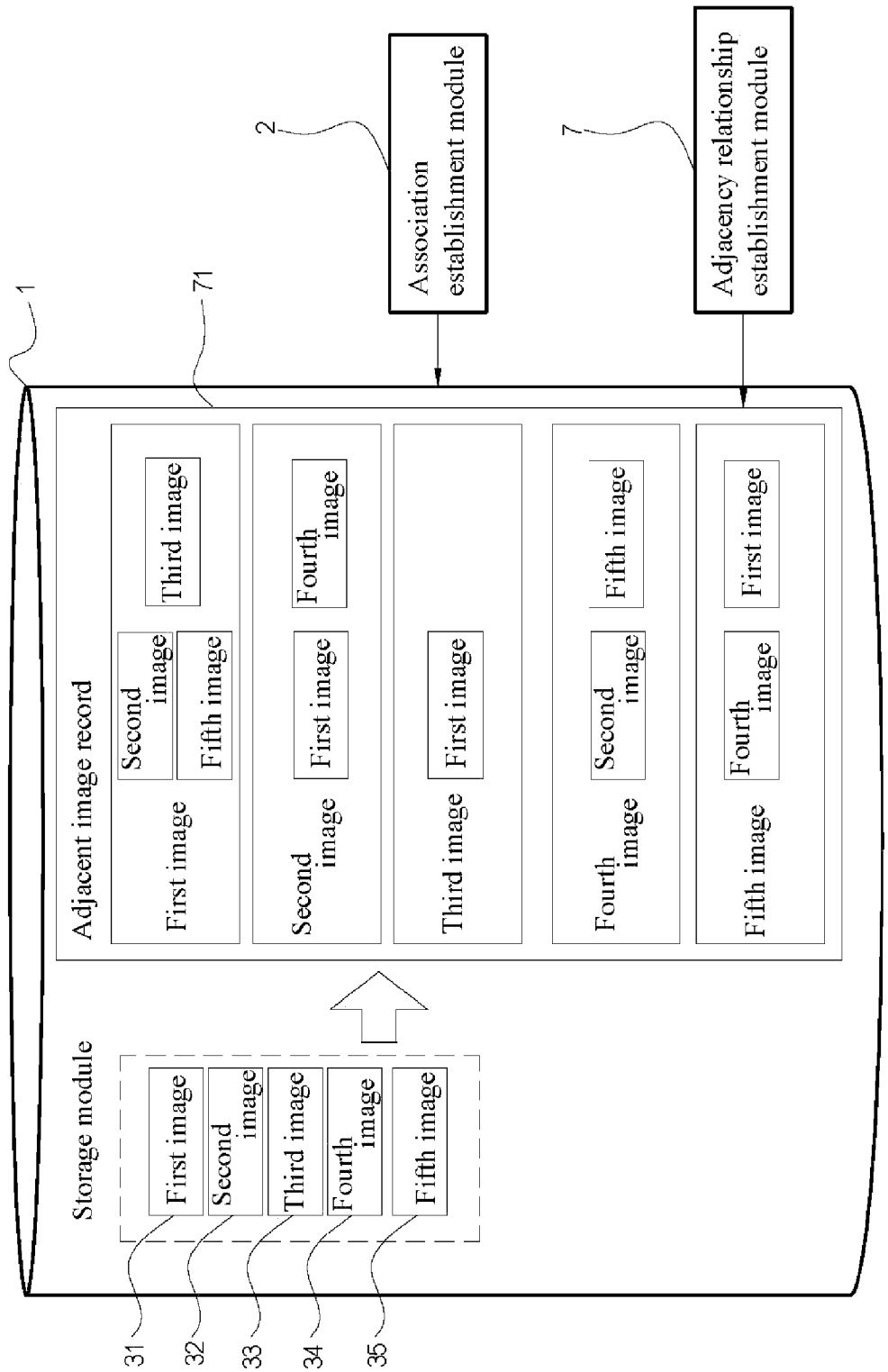
FIG. 3 is a block diagram of a third embodiment of the system for establishing an association for a plurality of images according to the present invention.

FIG. 3 is a block diagram of a third embodiment of the system for establishing an association for a plurality of images according to the present invention. The difference between FIG. 3 and FIGS. 1A and 2 lies in that, the system includes an adjacency relationship establishment module 7 for establishing an adjacency relationship between the images. The adjacency relationship establishment module 7 analyzes the adjacency relationship between the images so as to decide and record at least one adjacent image corresponding to each image. For example, the first image 31 is adjacent to the second image 32, the third image 33, and the fifth image 35; the second image 32 is adjacent to the first image 31 and the fourth image 34; the third image 33 is adjacent to the first image 31; the fourth image 34 is adjacent to the second image 32 and the fifth image 35; and the fifth image 35 is adjacent to the first image 31 and the fourth image 34.

The adjacency relationship establishment module 7 selects a currently processing image from all the images, regards all the other images as adjacent images adjacent to the currently processing image, and records the adjacent images into an adjacent image record. Then, the adjacency relationship establishment module 7 selects any two images from the adjacent image record, introduces an adjacency relationship screening principle into photographing points of the currently processing image and the any two images, and finds one image not conforming to the adjacency relationship screening principle from the two images and deletes the image from the adjacent image record. For example, the adjacency relationship screening principle mainly determines whether the photographing points of the currently processing image and the any two images approximate a straight line in the coordinate system.

Figure 1J:
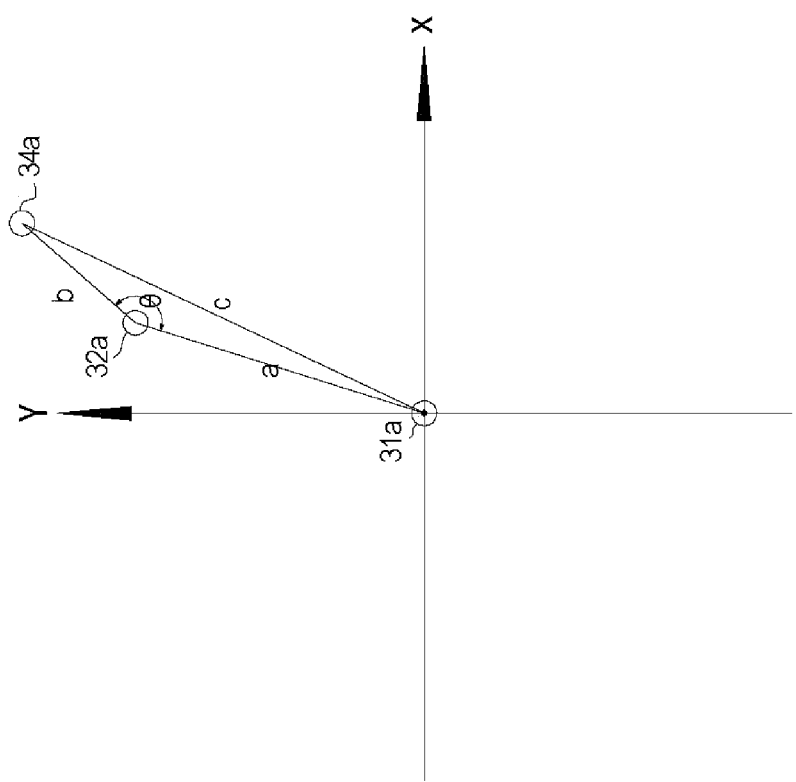
FIG. 1J is a schematic view illustrating image adjacency comparison according to an embodiment of the present invention.

FIG. 1J is a schematic view illustrating image adjacency comparison according to an embodiment of the present invention. As shown in FIGS. 1G and 1J, the adjacency relationship establishment module 7 regards the first image 31 as the currently processing image, regards the other images as adjacent images of the first image 31, and records the adjacent images into an adjacent image record 71. Then, the adjacency relationship establishment module 7 selects any two images, for example, the second image 32 and the fourth image 34, from the adjacent image record 71, and introduces the adjacency relationship screening principle into the first photographing point 31a, the second photographing point 32a, and the fourth photographing point 34a.

In one embodiment, the adjacency relationship screening principle is illustrated as follows.

Cos θ is calculated in the following equation: $(a^2+b^2-c^2)/2ab = \cos\theta$, where a is a distance between the first photographing point 31a and the second photographing point 32a, b is a distance between the second photographing point 32a and the fourth photographing point 34a, and c is a distance between the first photographing point 31a and the fourth photographing point 34a; and then, the adjacency relationship is determined according to whether cos θ is less than a fixed value δ. The physical meaning is that: when the included angle cos θ is less than a fixed value δ, it indicates that the second photographing point 32a is quite close to a line connecting the first photographing point 31a and the fourth photographing point 34a, so that no adjacency relationship exists between the first photographing point 31a and the fourth photographing point 34a, and the first image 31 and the fourth image 34 will not become adjacent images. δ is preset in the system or input by a user via a relevant interface (not shown). Afterwards, the adjacency relationship establishment module determines that the fourth photographing point is far away from the first photographing point, and deletes the fourth image from the adjacent image record.

On the contrary, it indicates that an adjacency relationship exists between the first photographing point 31a and the fourth photographing point 34a, and the first image 31 and the fourth image 34 are adjacent images.

In other embodiments, for the first image 31, the second image 32, and the fourth image 34 as shown in FIG. 1J, the adjacency relationship may also be determined using the following relational expression, for example:

$$(a+b)/c < \delta$$

or $(a^2+b^2)/c^2 < \delta$

That is, it is determined whether an adjacency relationship exists between the first photographing point 31a and the fourth photographing point 34a according to whether a ratio of (a+b) to c is less than a fixed value δ or whether a ratio of $(a^2+b^2)$ to $c^2$ is less than or equal to a fixed value δ.

Figure 4:
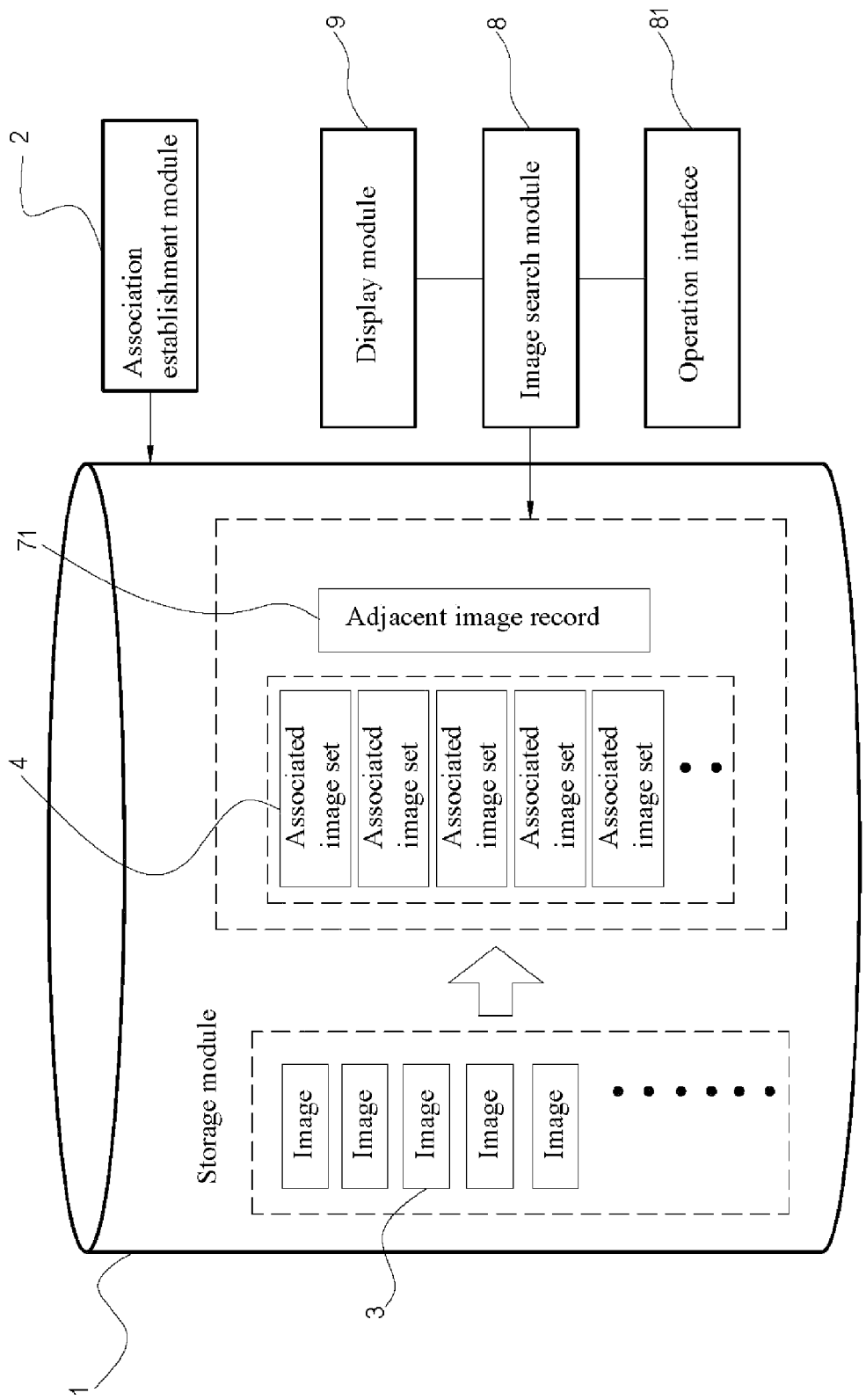
FIG. 4 is a block diagram of a fourth embodiment of the system for establishing an association for a plurality of images according to the present invention.

FIG. 4 is a block diagram of a fourth embodiment of the system for establishing an association for a plurality of images according to the present invention. The difference between this embodiment and the aforementioned embodiments lies in that, the system further includes an image search module 8. The image search module 8 is used for acquiring an image search condition and finding a target image from the images 3.

Further, the system establishes an adjacency relationship between the images and further includes an operation interface 81. The operation interface 81 is provided for a user to select an input image and input a search condition for the adjacency relationship. The image search module 8 finds a matched target image from the images 3 according to the input image and the corresponding adjacent image.

Reference is made to FIG. 1G at the same time. In this embodiment, the image search module is applicable to various different image search algorithms. Taking a greedy algorithm for example, when images are distributed uniformly, the complexity for finding the target image according to the input image and the image search condition is $O(n^{1/3})$, where n is a photographing point of the target image.

Figure 5A:
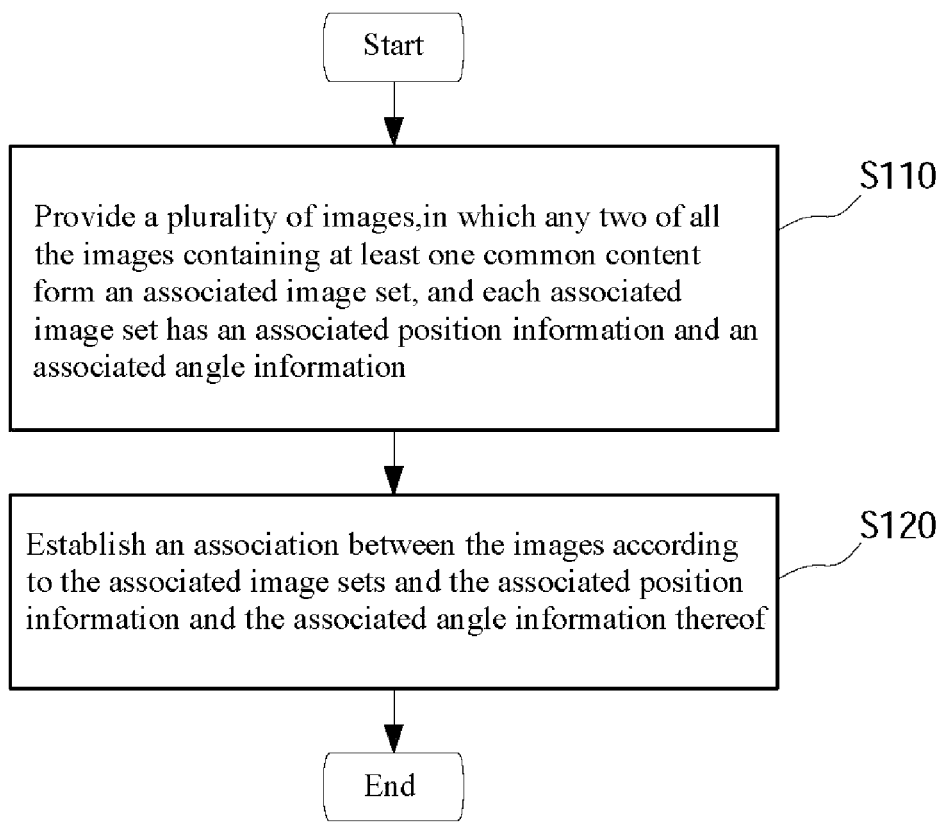
FIG. 5A is a flow chart of a method for establishing an association for a plurality of images according to an embodiment of the present invention.

FIG. 5A is a flow chart of a method for establishing an association for a plurality of images according to an embodiment of the present invention. Reference is made to FIG. 5A as well as FIGS. 1A to 4 for ease of understanding. The method includes the following steps.

A plurality of images 3 is provided, in which any two of all the images 3 containing at least one common content form an associated image set 4, and each associated image set 4 has an associated position information 41 and an associated angle information 42 (Step S110).

Reference is made to FIG. 1A at the same time. The storage module 1 stores all the images 3 and associated image sets 4 having common contents, as well as the associated position information 41 and the associated angle information 42 included in each associated image set 4.

Reference is made to FIGS. 1B and 1C at the same time. Two images 3 included in the same associated image set 4 respectively have a photographing point 3a with respect to a common content. The associated position information 41 is relative positions of the two photographing points 3a, and the associated angle information 42 is an included angle between photographing angles of the two photographing points 3a respectively with respect to the common content. The photographing point 3a and the photographing angle are a position and an angle of the image capturing module 5 relative to the common content when capturing a corresponding image 3. When the association between the images 3 is in the form of a two-dimensional space, the photographing angle includes a horizontal angle, and the associated angle information is an included angle between horizontal angles of the two photographing points respectively with respect to the common content. When the association between the images 3 is in the form of a three-dimensional space, the photographing angle includes a horizontal angle and a pitching angle, and the associated angle information is an included angle between horizontal angles of the two photographing points respectively with respect to the common content and an included angle between pitching angles of the two photographing points respectively with respect to the common content. The association between the images 3 is an association between the photographing points 3a corresponding to the images 3 and an association between the photographing angles corresponding to the images 3.

As shown in FIG. 1C, a first image 31 is corresponding to a first photographing point 31a, and a second image 32 is corresponding to a second photographing point 32a. A first photographing angle 31b of the image capturing module 5 when photographing a common content T at the first photographing point 31a and a second photographing angle 32b of the image capturing module 5 when photographing the common content T at the second photographing point 32a intersect to form an included angle A, which is the aforementioned associated angle information 41. The relative orientations and distance between the first photographing point 31a and the second photographing point 32a are the aforementioned associated position information 42.

The above-mentioned associated position information 41 and associated angle information 42 are camera parameters. The camera parameters may be obtained by calculating a fundamental matrix using the five points algorithm and then decomposing the matrix, or obtained by other camera calibration methods, which belongs to the prior art and thus will not be illustrated in detail herein.

The above-mentioned common content may be an object, a shape, a color block, or a feature point provided for identification that is captured in the same associated image set 4. The feature point may be a point having a specific feature in the image 3. The feature may be edge, corner, significant color change, or the like. Feature points having various different features may be obtained according to different feature point extraction methods. For example, the Moravec corner detection algorithm determines a position of a corner by determining whether neighboring patches are similar, and the SIFT finds a position of a potential feature point by calculating extrema of DOG.

Feature point matching means comparing feature points in one image 3 with feature points in other images 3, and determining whether the feature points are corresponding to the same spatial position. The matching may be performed by simply checking whether descriptors of the feature points are similar, or further detecting a correct corresponding relationship by using the RANSAC and fundamental matrix.

Reference is made to FIG. 2 at the same time. The system includes an image analysis module 6 for respectively generating corresponding photographing points and photographing angles for each associated image set 4 according to photographing information and the common content of the associated image set 4.

The association establishment module 2 establishes an association between the images 3 according to the associated image sets 4, the associated position information 41 and the associated angle information 42 thereof (Step S120).

Figure 5B:
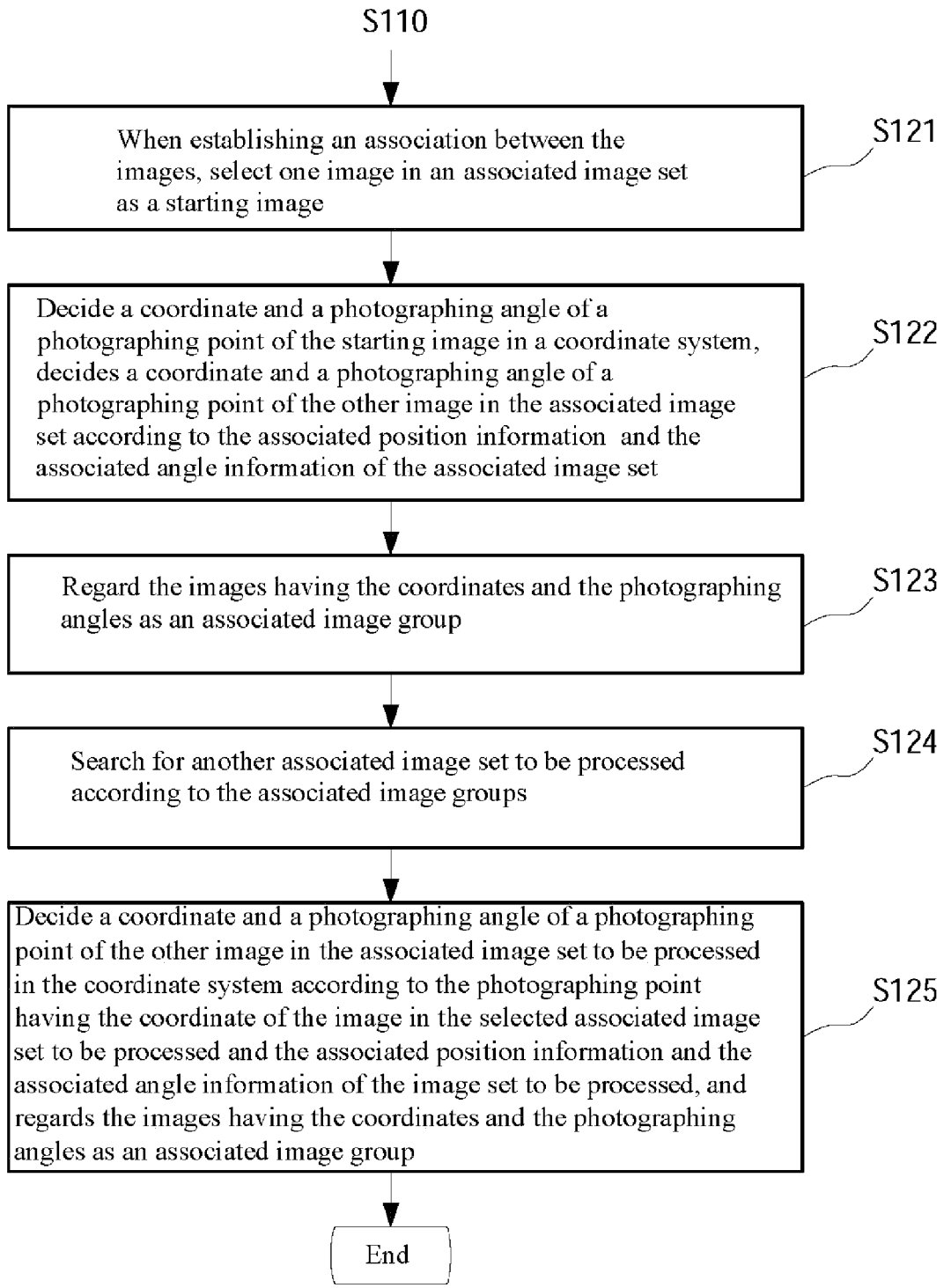
FIG. 5B is a detailed flow chart of the method for establishing an association for a plurality of images according to an embodiment of the present invention.

FIG. 5B is a detailed flow chart of the method for establishing an association for a plurality of images according to an embodiment of the present invention.

When establishing an association between the images 3, the association establishment module 2 first selects one image in an associated image set 4 as a starting image (Step S121), decides a coordinate and a photographing angle of a photographing point of the starting image in a coordinate system, decides a coordinate and a photographing angle of a photographing point of the other image in the associated image set 4 according to the associated position information 41 and the associated angle information 42 of the associated image set 4 (Step S122), and then regards the images having the coordinates and the photographing angles as an associated image group (Step S123). During the process, the association establishment module 2 selects an image 3 having a maximum number of associated image sets formed with other images as the starting image, which in this embodiment refers to, but is not limited to, an image having the highest frequency of occurrence in all the associated image sets.

As shown in FIGS. 1D, 1E, and 1F, the first image 31 having a maximum number of associated image sets formed with other images, so the association establishment module 2 selects the first image 31 as the starting image and regards the first photographing point 31a of the first image 31 as an origin of the coordinate system. Photographing angles corresponding to the photographing point at the origin are all zero, i.e., when the coordinate system is a two-dimensional space, a horizontal angle corresponding to the photographing point at the origin is zero; when the coordinate system is a three-dimensional space, a horizontal angle and a pitching angle corresponding to the photographing point at the origin are both zero. In this embodiment, a horizontal angle included in the first photographing angle 31b corresponding to the first photographing point 31a is zero.

Afterwards, the association establishment module 2 searches for another associated image set to be processed according to the associated image group (Step S124). One image in the selected associated image set to be processed is one image in the associated image group.

As shown in FIGS. 1D, 1E, and 1F, the association establishment module 2 finds the second image 32, the third image 33, and the fifth image 35 associated with the first image 31, decides coordinates and photographing angles of the second photographing point 32a, a third photographing point 33a, and a fifth photographing point 35a of the second image 32, the third image 33, and the fifth image 35 in the coordinate system, i.e., relative coordinates with respect to the first photographing point 31a (the photographing point of the starting image) and relative angles of photographing angles of the images with respect to the first photographing angle 31b of the first photographing point 31a, according to the associated position information 41 and the associated angle information 42 included in the associated image sets 4, and regards the first image 31, the second image 32, the third image 33, and the fifth image 35 as an associated image group.

The association establishment module 2 then decides a coordinate and a photographing angle of a photographing point of the other image in the associated image set to be processed in the coordinate system according to the photographing point having the coordinate of the image in the selected associated image set to be processed and the associated position information and the associated angle information of the image set to be processed, and regards the images having the coordinates and the photographing angles as an associated image group (Step S125).

As shown in FIGS. 1D, 1F, and 1G, the association establishment module 2 searches for images associated with the second image 32, the third image 33, and the fifth image 35. The second image 32 is associated with the fourth image 34, and the fifth image 35 is also associated with the fourth image 34, so the association establishment module 2 selects either the second image 32 or the fifth image 35 to perform the association operation of the fourth image 34.

The associated image set (the second image 32, the fourth image 34) is illustrated in this embodiment. The association establishment module 2 finds the fourth image 34 associated with the second image 32, decides a coordinate and a photographing angle of the fourth image 34 in the coordinate system, i.e., a relative coordinate with respect to the second photographing point 32a and a relative angle of a photographing angle of the fourth image 34 with respect to the photographing angle of the second photographing point 32a, according to the associated position information 41 and the associated angle information 42 included in the associated image set (the second image 32, the fourth image 34), and regards the first image 31, the second image 32, the third image 33, the fourth image 34, and the fifth image 35 as an associated image group. Thus, the association between the images is completed, as shown in FIG. 1G. The coordinates and the photographing angles of the photographing points of the finally completed associated image group form an image map. The image map formed in this embodiment is a two-dimensional space; however, this method is also applicable to the establishment of an image map corresponding to a three-dimensional space.

However, when deciding the coordinate of the photographing point of the other image in the associated image set to be processed during Step S125, the association establishment module 2 determines whether a comparison image having a photographing point with similar coordinate and photographing angle exists in all the associated image group. If the comparison image exists, the association establishment module 2 determines whether the comparison image and the other image in the associated image set to be processed have a common content. If no common content exists, the association establishment module 2 decides not to add the other image in the associated image set to be processed to the associated image group.

Further, the association establishment module 2 finds associated image sets to be processed formed by the image determined not to be added to the associated image group and other images, and then re-decides a coordinate and a corresponding photographing angle of the photographing point of the image determined not to be added in the coordinate system according to the associated position information and the associated angle information included in any one of the associated image sets to be processed.

As shown in FIGS. 1H and 1I, when loading a sixth photographing point 36a and a sixth photographing angle 36b of the sixth image 36 in the coordinate system, the association establishment module 2 determines that the sixth photographing point 36a and the sixth photographing angle 36b are similar to the third photographing point 33a and the third photographing angle 33b of the third image 33, i.e., regards the third image 33 as the aforementioned comparison image. The association establishment module 2 analyzes whether the third image 33 and the sixth image 36 have a common content. If the result of analysis is yes, the association establishment module 2 adds the sixth photographing point 36a and the sixth photographing angle 36b corresponding to the sixth image 36 to the coordinate system, as shown in FIG. 1H.

On the contrary, if the result of analysis is no, the association establishment module 2 does not add the sixth photographing point 36a and the sixth photographing angle 36b corresponding to the sixth image 36 to the coordinate system.

Further, assuming that the sixth image is associated with the fifth image, the association establishment module 2 determines that the sixth image 36 and the fifth image 35 form an associated image set, and decides a coordinate and a photographing angle of the sixth photographing point 36a of the sixth image 36 in the coordinate system, i.e., a relative coordinate with respect to the fifth photographing point 35a and a relative angle of the sixth photographing angle 36b of the sixth image 36 with respect to the photographing angle of the fifth photographing point 35a, according to an associated position information 41 and an associated angle information 42 included in the associated image set. As shown in FIG. 1I, the form of loading the sixth photographing point 36a and the sixth photographing angle 36b in the coordinate system is corrected.

Figure 6:
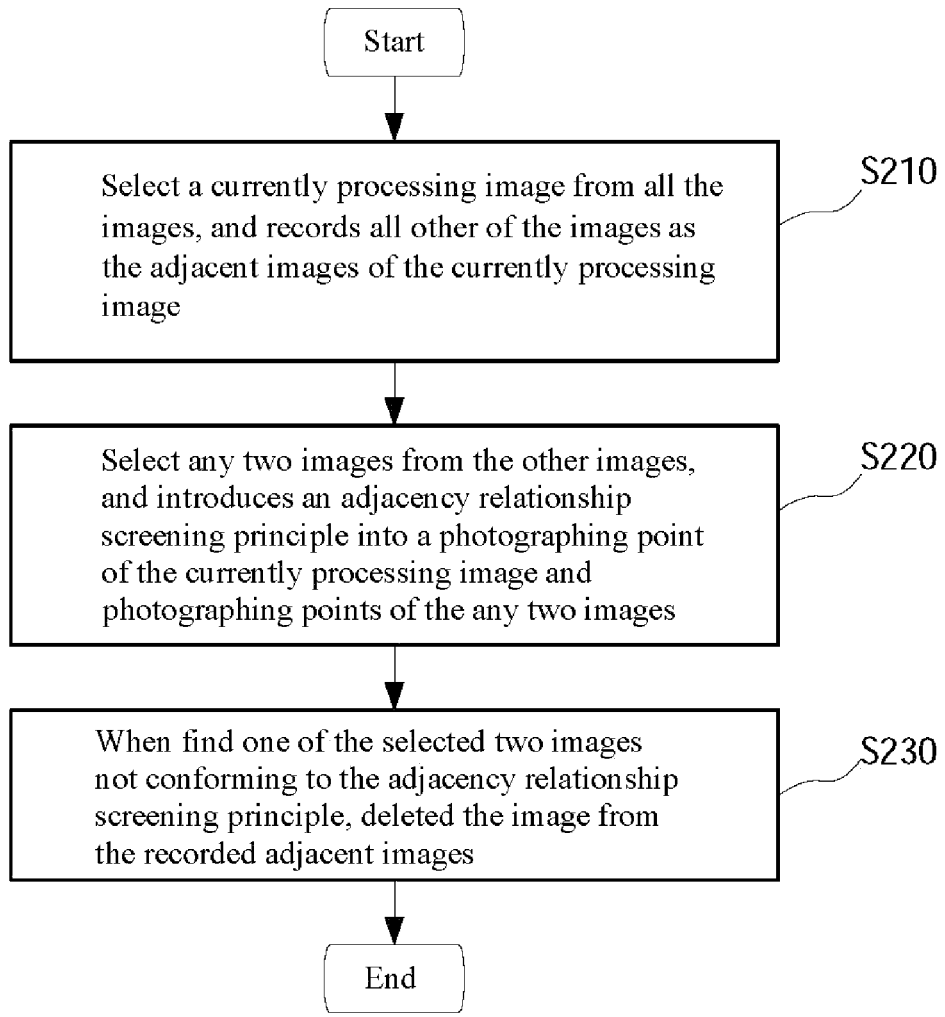
FIG. 6 is a flow chart of a method for establishing an image adjacency relationship according to an embodiment of the present invention.

FIG. 6 is a flow chart of a method for establishing an image adjacency relationship according to an embodiment of the present invention. Reference is made to FIG. 6 as well as FIGS. 1A to 4 for ease of understanding. The method for establishing an image adjacency relationship is as follows.

As shown in FIG. 3, the system includes an adjacency relationship establishment module 7 for establishing an adjacency relationship between the images 3. The adjacency relationship establishment module 7 decides and records at least one corresponding adjacent image for each of the images 3. Detailed steps are illustrated as follows.

The adjacency relationship establishment module 7 selects a currently processing image from all the images 3, and records all other of the images 3 as the adjacent images of the currently processing image (Step S210).

The adjacency relationship establishment module 7 selects any two images from the other images, and introduces an adjacency relationship screening principle into a photographing point of the currently processing image and photographing points of the any two images 3 (Step S220).

When one image not conforming to the adjacency relationship screening principle is found from the selected two images, and then deleted the image from an recorded adjacent images 71 (Step S230).

For example, the adjacency relationship screening principle mainly determines whether the photographing points of the currently processing image and the any two images approximate a straight line in the coordinate system.

As shown in FIG. 1G, the adjacency relationship establishment module 7 regards the first image 31 as the currently processing image, regards the other images as adjacent images of the first image 31, and records the adjacent images into an adjacent image record 71. Then, the adjacency relationship establishment module 7 selects any two images, for example, the second image 32 and the fourth image 34, from the adjacent image record 71, and introduces the adjacency relationship screening principle into the first photographing point 31a, the second photographing point 32a, and the fourth photographing point 34a. The adjacency relationship screening principle is as illustrated above, so the details will not be described herein again. The adjacency relationship establishment module 7 further records adjacent images of the images 3 according to the screening result, for example, after deleting the record of the image from the records of the adjacent images not conforming to the adjacency relationship screening principle.

Figure 7A:
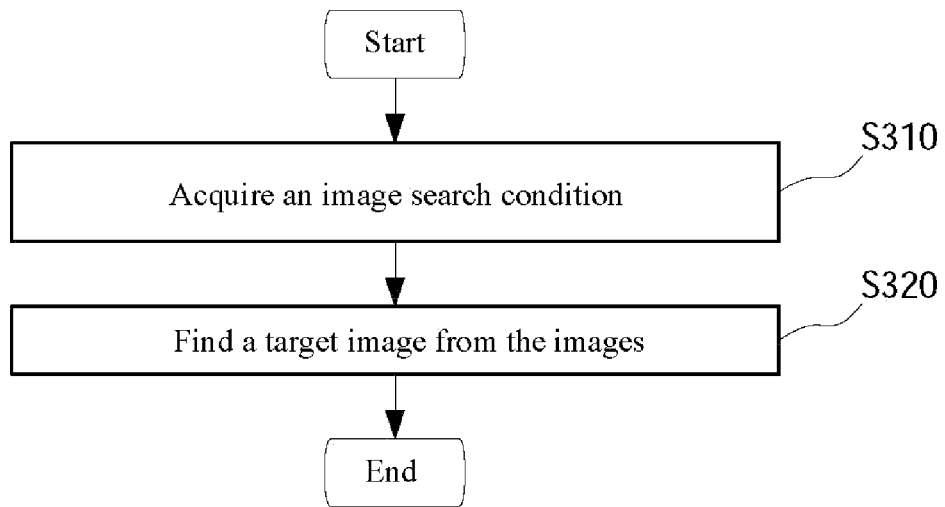
FIG. 7A is a flow chart of an image search method according to an embodiment of the present invention.

FIG. 7A is a flow chart of an image search method according to an embodiment of the present invention. Reference is made to FIG. 7A as well as FIGS. 1A to 4 for ease of understanding.

As shown in FIG. 4, the system further includes an image search module 8. The image search module 8 is used for acquiring an image search condition (Step S310) and finding a target image from the images 3 (Step S320).

Figure 7B:
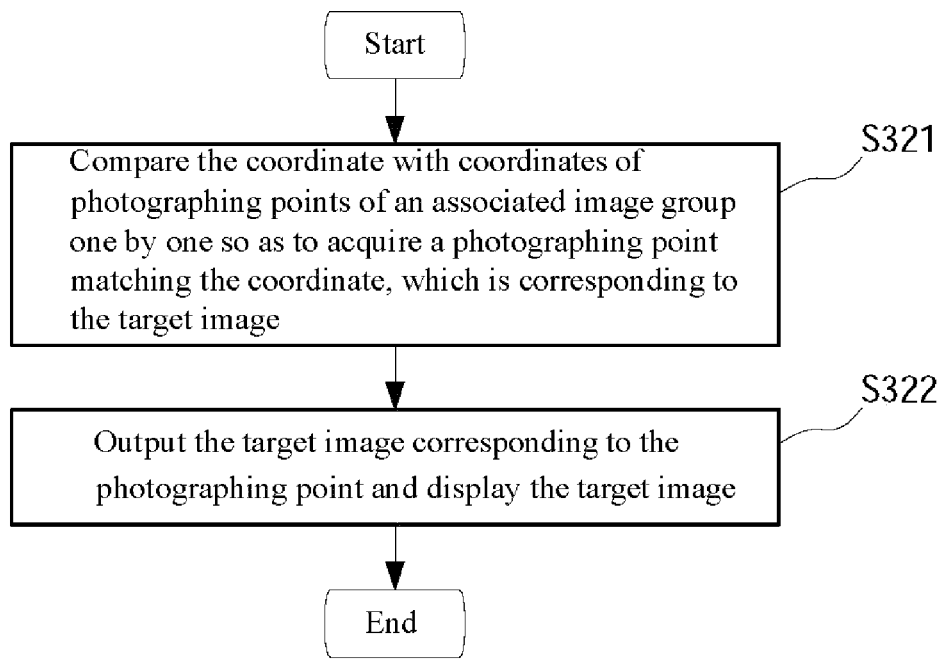
FIG. 7B is a detailed flow chart of the image search method according to an embodiment of the present invention.

FIG. 7B is a detailed flow chart of the image search method according to an embodiment of the present invention. When the image search condition is a coordinate, Step S320 further includes the following detailed steps.

The image search module 8 compares the coordinate with coordinates of photographing points of an associated image group one by one so as to acquire a photographing point matching the coordinate, which is corresponding to the target image (Step S321).

Afterwards, the image search module 8 further outputs the target image corresponding to the photographing point, and a display module 9 displays the target image (Step S322).

Figure 7C:
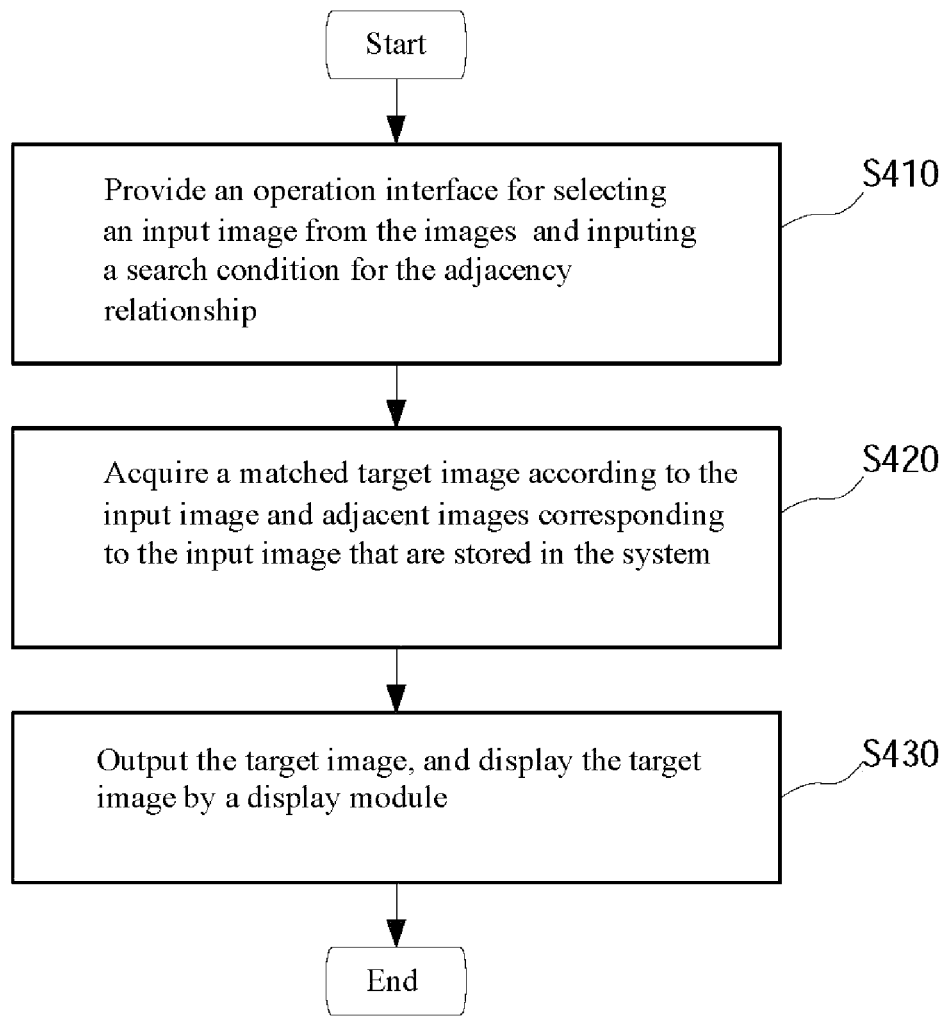
FIG. 7C is a flow chart of another example of the image search method according to an embodiment of the present invention.

FIG. 7C is a flow chart of another example of the image search method according to an embodiment of the present invention, which is illustrated below.

As shown in FIG. 4, the system further includes an operation interface 81 provided for a user to select an input image from the images 3 and input a search condition for the adjacency relationship (Step S410).

Then, the image search module 8 acquires a matched target image according to the input image and adjacent images corresponding to the input image that is stored in the system (Step S420).

Afterwards, the image search module 8 further outputs the target image, and a display module 9 displays the target image (Step S430).

In addition, the present invention further provides a recording medium, which is readable by an electronic device to perform the above method for establishing an association for a plurality of images. The recording medium includes a first program code and a second program code. The operation of the first program code is equivalent to that of the storage module, and the operation of the second program code is equivalent to that of the association establishment module, so the details will not be described herein again.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for establishing an association for a plurality of images, comprising:

a storage module, for storing a plurality of images, wherein any two of the images having a common content form an associated image set, each associated image set is corresponding to an associated position information and an associated angle information, each image in the associated image set respectively has a photographing point with respect to a common content therein, the associated position information is relative positions of the two photographing points, and the associated angle information is an included angle between photographing angles of the two photographing points respectively with respect to the common content;

an association establishment module, for establishing an association between the images according to the associated image sets and the associated position information and the associated angle information thereof; and an adjacency relationship establishment module for establishing an adjacency relationship between the images, wherein the adjacency relationship establishment module comprises steps of selecting a currently processing image from the images and recording all other of the images as the adjacent images of the currently processing image, selecting any two images from the other images and introducing an adjacency relationship screening principle into a photographing point of the currently processing image and photographing points of the selected two images, and when finding one of the selected two images not conforming to the adjacency relationship screening principle, deleting the record of the image from the records of the adjacent images.

2. The system according to claim 1, wherein the photographing point and the photographing angle are a position and an angle of an image capturing module relative to the common content when capturing the image.

3. The system according to claim 2, further comprising an image analysis module for respectively generating the corresponding photographing points and photographing angles for the associated image set according to photographing information and the common content of the associated image set.

4. The system according to claim 1, further comprising an image search module for acquiring an image search condition and searching a target image from the images.

5. The system according to claim 1, wherein when establishing the association between the images, the association establishment module selects one image in an associated image set as a starting image, decides a coordinate and a photographing angle of a photographing point of the starting image in a coordinate system, decides a coordinate and a photographing angle of a photographing point of another image in the associated image set according to the associated position information and the associated angle information of the associated image set, and then regards the images having the coordinates and the photographing angles as an associated image group.

6. The system according to claim 5, wherein the coordinate of the photographing point of the starting image in the coordinate system is an origin, the photographing angle comprises a horizontal angle and a pitching angle, and the horizontal angle and the pitching angle are zero; and coordinates of photographing points of other images in the associated image group in the coordinate system are relative coordinates with respect to the photographing point of the starting image, and photographing angles of the other images are relative angles with respect to the photographing angle of the starting image.

7. The system according to claim 5, wherein when deciding the coordinate of the photographing point of the other image in the associated image set to be processed, the association establishment module further determines whether a comparison image having a photographing point with similar coordinate and photographing angle exists in the associated image group, and if yes, determines whether the comparison image and the other image in the associated image set to be processed have a common content, and if no common content exists, decides not to add the other image in the associated image set to be processed to the associated image group.

8. The system according to claim 1, further comprising an image search module for acquiring an image search condition and searching a target image from the images, wherein the image search condition is a coordinate, the image search module compares the coordinate with coordinates of photographing points of an associated image group one by one so as to acquire a photographing point matching the coordinate, and an image corresponding to the matched photographing point is displayed.

9. A method for establishing an association for a plurality of images, comprising:

providing a plurality of images, wherein any two of the images containing a common content form an associated image set, each of the associated image sets has an associated position information and an associated angle information, each image in the associated image set respectively has a photographing point with respect to a common content therein, the associated position information is relative positions of the two photographing points, and the associated angle information is an included angle between photographing angles of the two photographing points respectively with respect to the common content;

establishing an association between the images according to the associated image sets and the associated position information and the associated angle information thereof;

selecting a currently processing image from all the images, and recording all other of the images as the adjacent images of the currently processing image;

selecting any two images from the other images, and introducing an adjacency relationship screening principle into a photographing point of the currently processing image and photographing points of the any two images; and deleting the image from an recorded adjacent images when one image not conforming to the adjacency relationship screening principle is found from the selected two images.

10. The method according to claim 9, wherein the photographing point and the photographing angle are a position and an angle of an image capturing module relative to the common content when capturing the image.

11. The method according to claim 10, further comprising: respectively generating the corresponding photographing points and photographing angles for the associated image set according to photographing information and the common content of the associated image set.

12. The method according to claim 9, further comprising: acquiring an image search condition and searching a target image from the images; and providing an operation interface for selecting an input image from the images and inputting a search condition for the adjacency relationship, and then acquiring a matched target image for display according to the input image and the recorded at least one adjacent image corresponding to the input image.

13. The method according to claim 9, further comprising: when establishing the association between the images, first selecting one image in an associated image set as a starting image, deciding a coordinate and a photographing angle of a photographing point of the starting image in a coordinate system, deciding a coordinate and a photographing angle of a photographing point of another image in the associated image set according to the associated position information and the associated angle information of the associated image set, and then regarding the images having the coordinates and the photographing angles as an associated image group.

14. The method according to claim 13, wherein the coordinate of the photographing point of the starting image in the coordinate system is an origin, the photographing angle comprises a horizontal angle and a pitching angle, and the horizontal angle and the pitching angle are zero; and coordinates of photographing points of other images in the associated image group in the coordinate system are relative coordinates with respect to the photographing point of the starting image, and photographing angles of the other images are relative angles with respect to the photographing angle of the starting image.

15. The method according to claim 13, wherein when deciding the coordinate of the photographing point of the other image in the associated image set to be processed, the method further comprises: determining whether a comparison image having a photographing point with similar coordinate and photographing angle exists in the associated image group, and if yes, determining whether the comparison image and the other image in the associated image set to be processed have a common content, and if no common content exists, deciding not to add the other image in the associated image set to be processed to the associated image group.

16. The method according to claim 9, further comprising: acquiring an image search condition and searching a target image from the images, wherein the image search condition is a coordinate, and the method further comprises: comparing the coordinate with coordinates of photographing points of an associated image group one by one so as to acquire a photographing point matching the coordinate, and displaying the target image corresponding to the matched photographing point.

17. A non-transitory computer recording medium, readable by an electronic device to perform a method for establishing an association for a plurality of images, the computer recording medium comprising:
a first program code, for storing a plurality of images, wherein any two of the images containing a common content form an associated image set, each of the associated image sets has an associated position information and an associated angle information, each image in the associated image set respectively has a photographing point with respect to a common content therein, the associated position information is relative positions of the two photographing points, and the associated angle information is an included angle between photographing angles of the two photographing points respectively with respect to the common content;
establishing an association between the images according to the associated image sets and the associated position information and the associated angle information thereof;
selecting a currently processing image from all the images, and recording all other of the images as the adjacent images of the currently processing image;
selecting any two images from the other images, and introducing an adjacency relationship screening principle into a photographing point of the currently processing image and photographing points of the any two images; and
deleting the image from an recorded adjacent images when one image not conforming to the adjacency relationship screening principle is found from the selected two images.

* * * * *